United States Patent [19]

Schaffer

[11] Patent Number: 4,551,725

[45] Date of Patent: Nov. 5, 1985

[54] SYSTEM FOR IDENTIFICATION AND DETERMINATION OF THE MOMENT OF PASSAGE OF A MULTIPLE NUMBER OF MOVING BODIES AT A GIVEN POINT ON THEIR PATH

[75] Inventor: Rudolf Schaffer, La Chaux-de-Fonds, Switzerland

[73] Assignee: Compagnie des Montres Longines Francillon S.A., Switzerland

[21] Appl. No.: 414,913

[22] Filed: Sep. 3, 1982

[30] Foreign Application Priority Data

Sep. 7, 1981 [CH] Switzerland ........................ 5751/81

[51] Int. Cl.[4] ............................................ G01S 13/78

[52] U.S. Cl. ............................................ 343/6.5 SS

[58] Field of Search .................................. 343/6.5 SS

[56] References Cited

U.S. PATENT DOCUMENTS

| | | | |
|---|---|---|---|
| 3,546,696 | 12/1970 | Waters et al. | 343/6.5 LC |
| 3,714,649 | 1/1973 | Brouwer et al. | 343/6.5 R |
| 3,839,717 | 10/1974 | Paul | 343/6.5 LC |
| 3,918,057 | 11/1975 | Van Tol | 343/5 SS X |
| 3,982,243 | 9/1976 | Gustavsson et al. | 343/6.5 SS X |
| 4,069,472 | 1/1978 | Kamata et al. | 343/6.5 SS |
| 4,104,630 | 8/1978 | Chasek | 343/6.5 SS |
| 4,114,151 | 9/1978 | Denne et al. | 343/6.5 SS X |
| 4,123,754 | 10/1978 | Armstrong | 343/6.5 SS |
| 4,288,689 | 9/1981 | Lemelson et al. | 343/6.5 SS X |
| 4,358,765 | 11/1982 | Henoch et al. | 343/6.5 SS |

*Primary Examiner*—T. H. Tubbesing

*Attorney, Agent, or Firm*—Peter L. Berger

[57] ABSTRACT

The system comprises a mobile device mounted (2) on each moving body, a fixed receiving antenna (3) and means for processing (4) the identification signals emitted by the mobile devices (2). The frequency of these identification signals is representative of the respective moving bodies. In addition, a transmitter (22) is provided to send the devices (2) a control signal that serves, on the one hand, to allow power supply to be applied to means for generating the identification signals and, on the other, serves as reference signal for those means, which do not have their own time base. This system is particularly well suited to the timing of automobile races.

18 Claims, 4 Drawing Figures

SYSTEM FOR IDENTIFICATION AND DETERMINATION OF THE MOMENT OF PASSAGE OF A MULTIPLE NUMBER OF MOVING BODIES AT A GIVEN POINT ON THEIR PATH

BACKGROUND OF THE INVENTION

This invention concerns a system for identification and determination of a multiple number of moving bodies at a given point on their path.

Such systems enable automatic timing of sports events like automobile races, for example. They generally include a mobile device mounted on each moving body. Each mobile device includes a transmitter capable of emitting a characteristic radio identification signal from the moving body. A fixed receiving antenna is set up in proximity to the said given point and designed to receive the different identification signals, and means are provided for processing the identification signals received by the receiving antenna to determine for each signal the identity of the moving body which emitted it and the moment of its passage by the receiving antenna.

In the systems known to date, as, for example, in the one described in British Pat. No. 1,517,173, the mobile transmitter contains a multivibrator or a quartz oscillator tuned to a frequency characteristic of the moving body which carries it, and it permanently emits the identification signal of the moving body. The receiving antenna is usually set up on the ground across the path of the moving bodies.

These systems have a number of disadvantages, including that of requiring high electric power consumption by the carried devices. Consequently, these devices, which must contain their own power supply, are difficult to miniaturize and it is necessary to provide devices and procedures for turning them off whenever the moving bodies are not being timed. In the case of automobile races, for example, the timing crews must constantly intervene, for example, between different trial meets, in order to switch the different transmitters on and off. This imposes a burden on the crews, and, when an error occurs, the power source of one transmitter or another will be discharged or transmitters may even be disconnected at the starting time of the race.

Another difficulty associated with operating the transmitters continuously over the entire path of the moving bodies, which often exceeds several kilometers is the radio enroachment that such a system can make in the vicinity of the course where the trial to be timed is run. The extent of that enroachment, combined with the strict regulations relating to the use of radio frequencies, results in limiting the possibilities of using known systems.

Other disadvantages are due to the nature of the transmitters used on the moving bodies. Electronic multivibrator circuits are difficult to stabilize under the harsh conditions which might prevail, notably, during automobile races. The use of quartz oscillators has also been developed, but the fragility of these devices has led to numerous failures, notably, in case of shock.

Furthermore, as long as the sole characteristic of the identification signals consists of their frequency, their detection by the means of processing these signals in an environment that generally creates interference is difficult. That fact usually leads to increasing the transmitter power or using complex antennas, formed, for example, by a combination of antennas, as described in U.S. Pat. No. 4,274,076.

U.S. Pat. No. 3,546,696 previously described a system in which the moving bodies are equipped with mobile devices containing a receiver which triggers the emission of an identification signal the moment it receives a control signal emitted by a fixed transmitter set up below the finish line. However, the moment of passage is defined by the exact instant of tripping, which implies an absolutely directional fixed transmitting antenna and low-level transmission to prevent a premature tripping of mobile transmitters. This results in difficulties in setting up the antenna and in an increased risk of error in timing likely to be caused by an accidental tripping of a mobile transmitter due to interference. Furthermore, the transmitters described are each equipped with a quartz oscillator and an audio frequency oscillating circuit to produce the identification signal, and the problems involved in such systems has already been described.

An object of this invention is to provide a system which solves the above-mentioned problems, by making it possible to reduce substantially the power consumption of the mobile devices as well as the extent of radio encroachment of the system, allowing the elimination of quartz oscillators and offering new possibilities of detection of identification signals without complicating the structure of the antenna placed on the finish line.

The invention provides several advantages including the possibility of easily selecting for the different mobile devices of identical design the characteristic frequency of their identification signals and of very precisely determining the moment of passage of the moving body by the receiving antenna. Furthermore, the system according to the invention may very easily be used for transferring different information from the moving bodies to the receiving antenna or vice versa.

These objects and advantages are attained by providing for the control signal to be emitted by the fixed transmitter in a limited portion of the space situated in front of and past the line. In addition, each mobile device includes means for operating the transmitter it contains as long as its receiver receives the control signal. In that way, the identification signal is emitted throughout the duration of passage of the moving body past the line, and means of processing that signal can use variations of intensity or of frequency for determining in a very precise manner, unassociated with the directivity of the antenna, the exact moment of passage over the line.

The identification signal is produced directly from the control signal, so that a phase relationship exists between these different signals, which an be advantageous to the means of for processing the identification signals.

BRIEF DESCRIPTION OF THE DRAWING

The invention will be clearly understood by reading the specification that follows, given in connection with the attached drawing, among which.

DETAILED DESCRIPTION OF THE DRAWINGS

Figure 1:
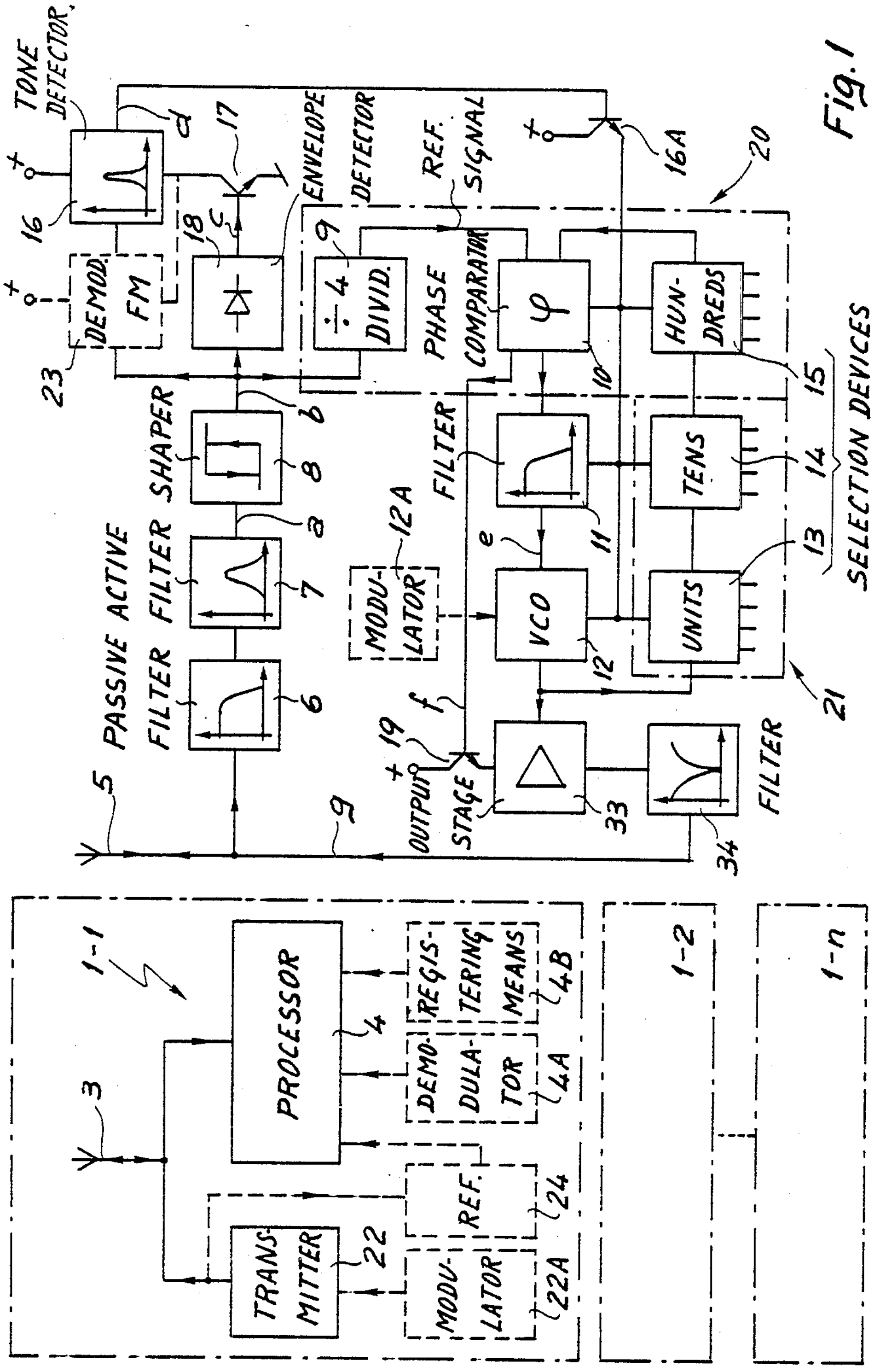
FIG. 1 is a block diagram of a system according to one particular embodiment of the invention.

In FIG. 1 a system according to the invention is represented schematically and by blocks, comprising fixed stations 1-1 to 1-n and a multiple number of devices 2 mounted on moving bodies, such devices being called hereinafter "mobile devices".

The fixed elements include a fixed receiving antenna 3, consisting, for example of a cable placed across the finish line of a sports event. The fixed antenna 3 receives identification signals emitted by the mobile devices 2, which are used in the conventional manner in the processing means 4.

The system further includes a fixed transmitter 22, preferably utilizing the same antenna 3 to emit a signal for controlling mobile devices 2, at a frequency of 80 kHz, for example.

According to one important aspect of the invention, the control signal is emitted in a limited portion of the space situated in front of and past the finish line. The total length of that portion is about ten meters, for example.

The mobile devices include a receiving antenna 5 for receiving the control signal, which is then filtered in a passive filter 6 and an active filter 7, after which it is shaped in a shaping circuit 8. Waveforms a and b of FIG. 2 respectively show the shape of the signals at points a and b on FIG. 1, produced after active filter 7 and circuit 8, each waveform of FIG. 2 showing voltage as a function of time.

After passage into a dividely four frequency divider 9, the signal shaped, at 20 kHz, is supplied to a phase lock loop of known type (PLL) consisting of a phase comparator 10, a filter 11, a voltage-controlled oscillator 12 and selection devices 13, 14, 15, making it possible to choose respectively the units, tens and hundreds of the ratio between the frequency of the identification signal produced by the oscillator 12 and the frequency of the reference signal at 20 kHz. That loop is preferably so formed that the frequency of the identification signal ranges between 2.5 and 3.5 MHz. It may then vary by 20-kHz steps between those limits, which makes it possible to identify and time 50 different moving bodies.

Figure 2:
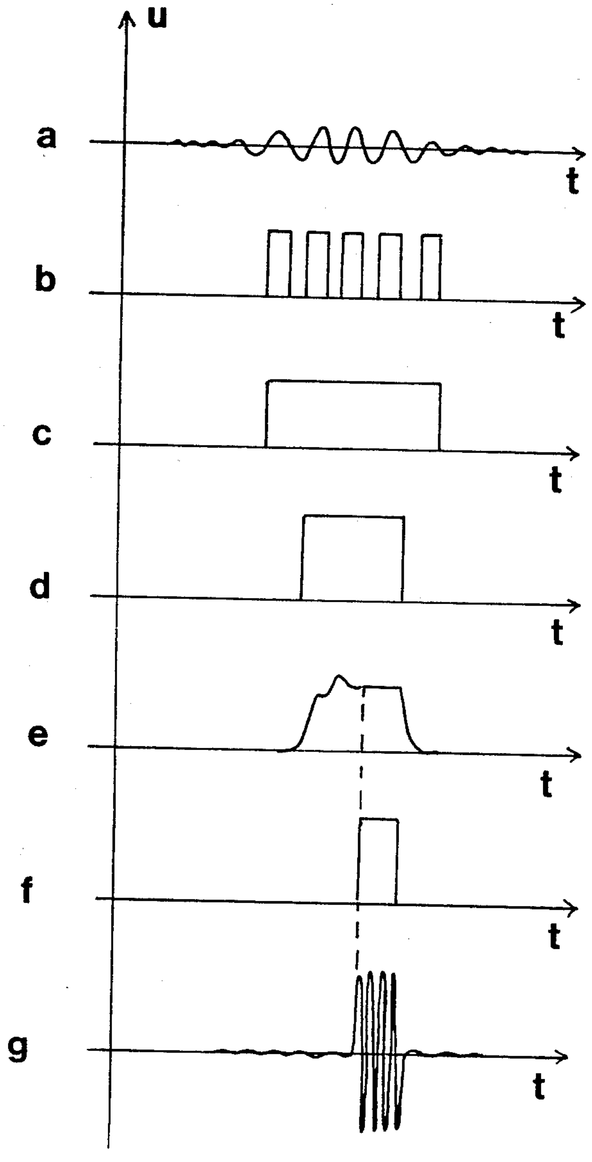
FIG. 2 is a diagram representing the waveforms of the signals picked up at different points of the diagram of FIG. 1.

The signal produced by filter 11, that is, at point e on FIG. 1, is represented in waveform e of FIG. 2.

The identification signal produced by the oscillator 12 is next injected into an output stage 33 and then filtered in a filter 34 before being sent back over the antenna 5 of the mobile device. The signal present on antenna 5 at the time of passage of the moving body next to antenna 3 is represented in waveform and is g of FIG. 2 and is formed by superposition of the 80-kHz control signal and of the identification signal.

To limit the power consumption of the mobile device, the elements comprising the phase lock loop are supplied through a transistor 16A controlled by the output of a tone detector 16 tuned to the frequency of the control signal. The loop thus operates only when the control signal is received by antenna 5, that is, in immediate proximity to the fixed antenna 3.

In the same way, the tone detector 16 is supplied through a transistor 17 only during the time when a signal is present on the output of shaping circuit 8. For that purpose, the envelope of this signal is produced by an envelope forming circuit 18, the output of which controls transistor 17. This output signal is applied on the base of transistor 17 and represented in waveform c of FIG. 2. The output signal of tone detector 16 is shown in waveform d of FIG. 2.

In addition, in order to guarantee that the output stage 33 is activated only when the phase lock loop is actually stabilized, stage 33 is supplied through a transistor 19 controlled by a locking signal produced by the phase detector 10. That signal, at point f, is represented in waveform f of FIG. 2.

In FIG. 1, it will also be observed that circuits 9, 10 and 15 have been grouped within a dotted-line frame 20, while circuits 13 and 14 have been grouped within a frame 21. Those frames represent the single integrated circuits used to perform the functions of the different blocks included in the frames in the detailed electronic diagram of FIG. 3.

It is to be understood that the arrangement represented in FIG. 1 could be modified by one skilled in the art yet remain within the teachings of this invention.

For example, the 80-kHz control signal could easily be replaced by a frequency-modulated signal, notably, to reduce further the influence of interference. It would then be sufficient to modify the mobile devices by the addition of a demodulator 23 represented in dotted lines at the input to the tone decoder 16.

Of course, the signal feeding the phase lock loop would also be frequency-modulated, and the filter 11 of that loop would have to be modified accordingly.

Similarly, the system of the invention could be used to transmit information other than the identification signal from the fixed antenna to the mobile device or vice versa. It would be sufficient, for example, to modulate in a modulator 22A the control signal emitted by the fixed antenna and to connect to the mobile device means for decoding the information thus included in the control signal. An appropriate modulation by a modulator 12A of the signal supplied by the oscillator 12 of the mobile device and a demodulation by a demodulator 4A in the means 4 for processing identification signals would achieve the transmission of information from the mobile device to the fixed station.

The system of the invention could also be used to refine detection of the moment of passage of the moving bodies by employing the doppler effect, that is, the shift between the frequency of the identification signal emitted by each moving body and a socalled reference identification signal. It would be sufficient, for that purpose, to form from the control signal a reference signal produced in the same way as the reference signal in the mobile device, but in a fixed device marked by the dotted-line reference block 24 of FIG. 1. The processing means 4 could then comprise means 4B for registering the time of passage for a given moving body at the precise moment when the frequencies of the identification signal and of the reference identification signal are equal.

Of course, as shown in FIG. 1, several fixed stations 1-1 1-n containing a fixed antenna connected to a transmitter and a fixed receiver can be provided at several different places on the moving body path. In particular, some of them could then be reserved for timing and the others for transfer of information between the moving bodies and the fixed stations.

Figure 3A:
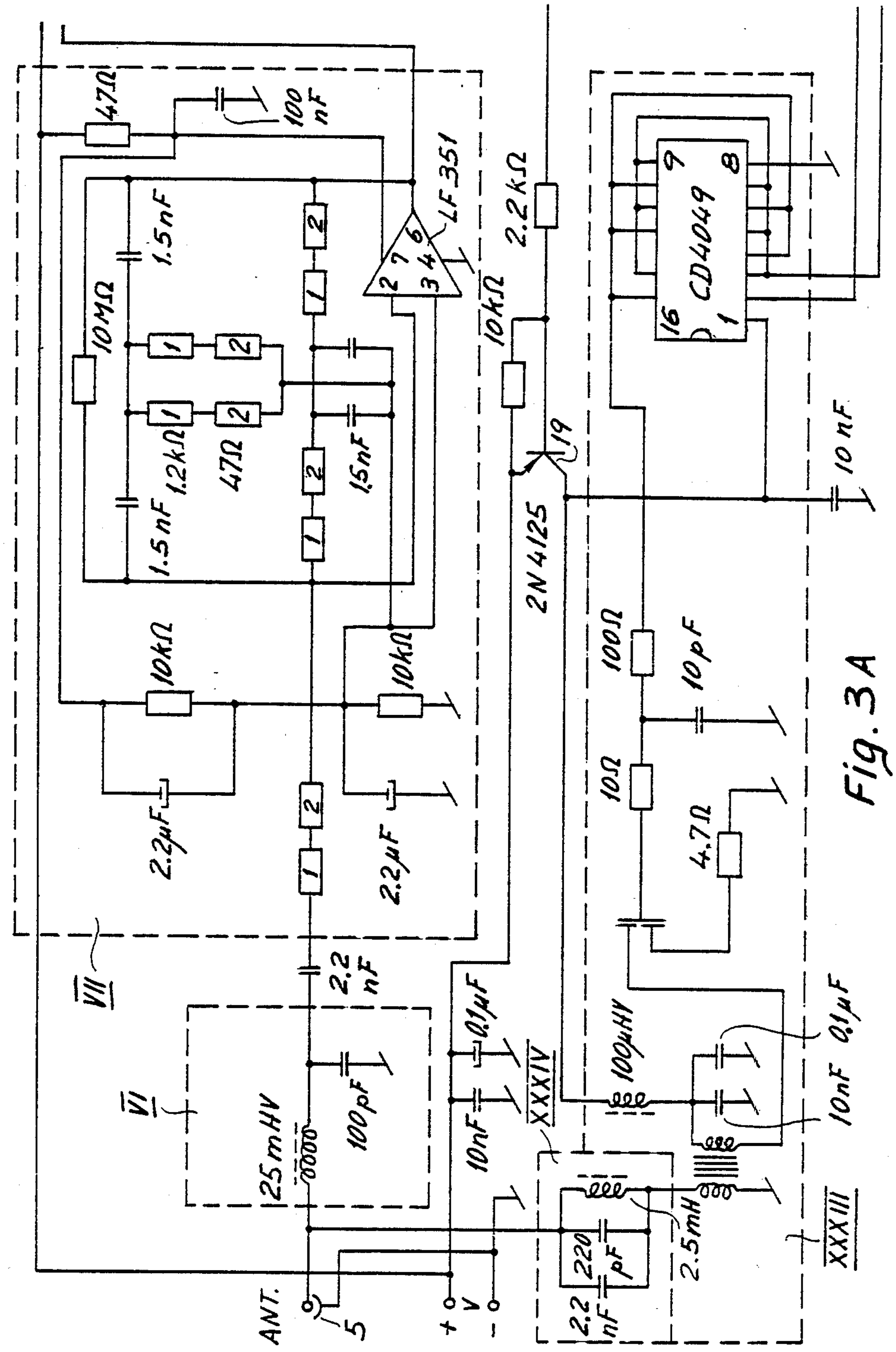
FIGS. 3A and 3B represent together a detailed electronic diagram of the mobile device represented on FIG. 1.
Figure 3B:
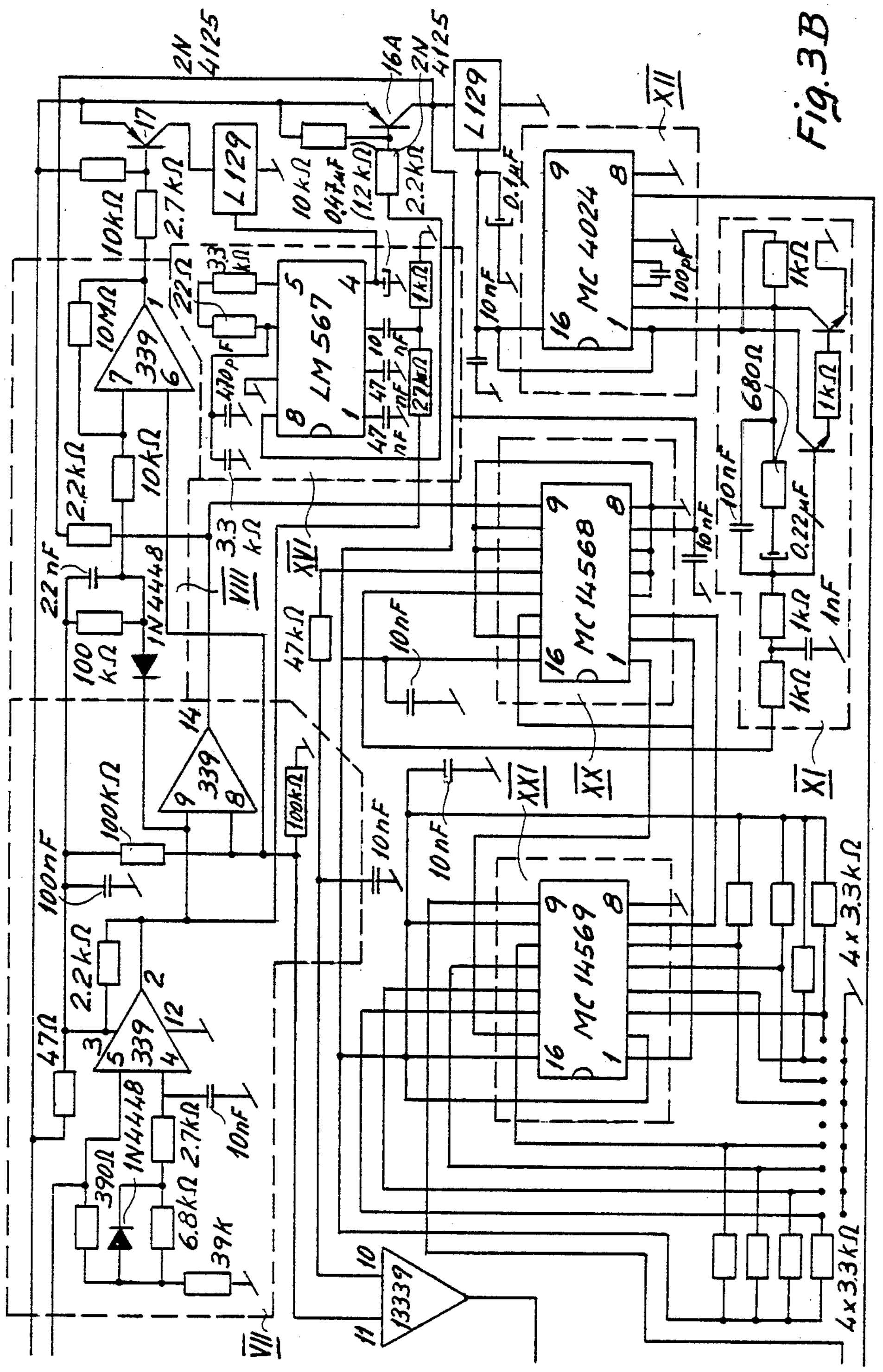

FIG. 3 represents, purely by way of indication, the detailed electronic diagram of the circuit of a mobile device made according to the principle of FIG. 1. That diagram indicates the values and references of the elements used. For greater clarity, the blocks of FIG. 1 have been defined by dotted-line frames on FIG. 3, to which the corresponding references of FIG. 1 have been assigned in Roman numerals.

The total current draw of the circuit amounts to approximately 3.5 mA when it is not receiving a control signal, and when it is emitting an identification signal to current rises to around 140 mA. That latter value is equivalent to the power consumption of the devices of the prior art. When the mobile device of the invention is connected to a battery of approximately 700 mAh capacity, it is then evident that its operating life increases from a few hours for the known systems to a few days for a reasonable number of passages of the mobile device by the fixed antenna. That is why it becomes possible to install the mobile devices for example, for timing of an automobile race, at the beginning of the racing days without having to touch them again until the end of the race.

What is claimed is:

1. A system for identification and determination of the moment of passage of a multiple number of moving bodies over a given line intersecting their path, comprising in combination:

- a plurality of mobile devices mounted respectively on said moving bodies, each of said mobile devices comprising transmitter means capable of transmitting a respective radio identification signal at a frequency which is representative of said moving body;
- a fixed receiving antenna set up on said line and to receive the respective identification signals;
- means for processing the identification signals received by the receiving antenna to identify each respective moving body which emitted it and the time each respective body passes by said receiving antenna;
- a fixed transmitter located in proximity to said given line for emitting a control signal controlling the transmitters of said mobile devices;
- each of said mobile devices further comprising
  - means for receiving said control signal,
  - means for generating said identification signal at said representative frequency,
  - first means connected between said receiving means and said generating means for converting said control signal into a reference signal with respect to which the value of said representative frequency signal is established,
  - second means also connected between said receiving means and said generating means for converting said control signal into a gate signal,
  - power supply means, and
  - gate means responsive to said gate signal for connecting said power supply means to said generating means and said transmitter means for applying power thereto only as long as said control signal is received by said receiver means.

2. A system according to claim 1, wherein said second converter means comprises a tone detector tuned to the frequency of the control signal, said gate means comprising switching means responsive to the output signal of said tone detector for allowing power to be applied by said power supply.

3. A system according to claim 2, wherein said gate means further comprises second switching means responsive to the output of said receiver means for connecting the tone detector to said power supply only when said control signal is received.

4. A system according to claim 3, further comprising circuit means connected between said receiving means and said second switching means for forming the envelope of the control signal, said envelope controlling activation of said second switching means.

5. A system according to claim 1, wherein the means for generating the identification signal comprises a phase lock loop, said phase lock loop comprising a voltage-controlled oscillator and means for selecting the ratio between the frequency of the identification signal generated by the voltage-controlled oscillator and the frequency of said reference signal.

6. A system according to claim 5, wherein each mobile device comprises an output stage, and said phase lock loop includes a phase comparator, said output stage being controlled by a signal produced by the phase comparator when the frequency of the identification signal is stabilized.

7. A system according to claim 1, wherein each mobile device comprises an output stage and means for supplying the output stage with the identification signal after stabilization of said identification signal.

8. A system according to claim 1, wherein said receiving antenna set up in proximity to the said given point is also connected to said fixed transmitter whereby said control signal is transmitted by said antenna.

9. A system according to claim 1, wherein each mobile device comprises a single antenna connected to said receiving means and said transmitter means, whereby said antenna is connected for receiving the control signal and emitting the identification signal.

10. A system according to claim 1, wherein the fixed transmitter comprises means for modulating said control signal with information to be transmitted to the moving body, said receiving means of each mobile device comprising means for demodulating said control signal as received by said receiving means, whereby said information can be detected in said moving body.

11. A system according to claim 1, wherein the transmitter means of each mobile device comprises a modulator means for modulating the identification signal with additional information to be transmitted to the fixed receiving antenna , and said processing means comprises demodulator means for detecting said additional information therein.

12. A system according to claim 1, wherein said processing means comprises means for generating a reference identification signal and means for registering the time of passage of said moving body when the frequencies of said identification signal transmitted by said body and said reference identification signal are equal.

13. A system according to claims 2, 3, 4, 5, 7, 6, 8, 9, 10, 11, 12 or 1 wherein said system further comprises at least one further fixed receiving antenna connected respectively to at least one further fixed transmitter, each set of an antenna and a transmitter being located at a different point on the path of the moving bodies.

14. A system for identification and determination of the moment of passage of a multiple number of moving bodies over a given line intersecting their path, comprising:

- a mobile device mounted on each moving body and comprising a transmitter capable of emitting a respective radio identification signal from each respective moving body;
- a fixed receiving antenna set up on said line and to receive the respective identification signals;

means for processing the identification signals received by the receiving antenna to identify each respective moving body which emitted it and the time each respective body passes by the receiving antenna;

a fixed transmitter located in proximity to said given line emitting a control signal controlling the transmitters of the mobile devices; and each mobile device comprising a receiver for the control signal, wherein the control signal is emitted in a limited space defined in front of and past and below the given line, and each mobile device further comprising means for operating the transmitter of said each mobile device as long as its receiver receives the control signal, and means for producing the identification signal using the control signal as a reference, said means for operating the transmitter of a mobile device comprising a tone detector tuned to the frequency of the control signal, said means for producing the identification signal being operated only when the tone detector detects the control signal, and said means for operating the transmitter of the mobile device further comprising means for supplying the tone detector only when said control signal is received.

15. A system according to claim 14, further comprising circuit means for forming the envelope of the control signal and supplying said envelope to the tone detector.

16. A system according to claim 14, wherein the means for producing the identification signal comprises a phase lock loop, said phase lock loop comprising a voltagecontrolled oscillator and means for selecting the ratio between the frequency of the identification signal generated by the voltage-controlled oscillator and the frequency of the phase lock loop reference signal, said loop reference signal being produced from the control signal.

17. A system according to claim 16, wherein each mobile device comprises an output stage, and said phase lock loop includes a phase comparator, said output stage being controlled by a signal produced by the phase comparator when the frequency of the identification signal is stabilized.

18. A system according to claim 14, wherein each mobile device comprises an output stage and means for supplying the output stage with the identification signal after stabilization of said identification signal.

* * * * *